(12) United States Patent
Salus (10) Patent No.: US 8,109,525 B2
(45) Date of Patent: Feb. 7, 2012

(54) GUIDING WHEEL ASSEMBLY, ESPECIALLY FOR A HOSPITAL BED

(75) Inventor: Michal Salus, Roudnice nad Labem (CZ)

(73) Assignee: Linet Spol. S R.O., Slany (CZ)

(*) Notice: Subject to any disclaimer, the term of this patent is extended or adjusted under 35 U.S.C. 154(b) by 237 days.

(21) Appl. No.: 12/447,094

(22) PCT Filed: Sep. 25, 2007

(86) PCT No.: PCT/CZ2007/000089
§ 371 (c)(1),
(2), (4) Date: Apr. 24, 2009

(87) PCT Pub. No.: WO2008/055451
PCT Pub. Date: May 15, 2008

(65) Prior Publication Data
US 2010/0088846 A1    Apr. 15, 2010

(30) Foreign Application Priority Data
Nov. 9, 2006 (CZ) .......................... PUV2006-18253

(51) Int. Cl.
*B60B 33/04* (2006.01)
*B60B 33/06* (2006.01)

(52) U.S. Cl. ............... 280/43; 5/510; 5/600; 280/43.24; 280/767; 180/209

(58) Field of Classification Search ............. 280/9, 43, 280/43.14, 43.24, 763.1, 767; 180/24.02, 180/209; 5/86.1, 510, 511, 600, 620, 658
See application file for complete search history.

(56) References Cited

U.S. PATENT DOCUMENTS

| 1,999,106 | A |  | 4/1935 | Muller |  |
| 5,348,326 | A | * | 9/1994 | Fullenkamp et al. | 280/43.17 |
| 5,377,372 | A | * | 1/1995 | Rudolf et al. | 5/600 |
| 5,937,959 | A | * | 8/1999 | Fujii et al. | 180/12 |
| 6,256,812 | B1 | * | 7/2001 | Bartow et al. | 5/86.1 |
| 6,286,165 | B1 |  | 9/2001 | Heimbrock et al. |  |
| 6,668,402 | B2 | * | 12/2003 | Heimbrock | 5/600 |
| 6,725,956 | B1 | * | 4/2004 | Lemire | 180/15 |

(Continued)

FOREIGN PATENT DOCUMENTS

DE    10126962 A1 * 10/2002

(Continued)

OTHER PUBLICATIONS

Toshiyasu Ishii, Transporting Carriage and Lift Caster, Nov. 17, 1998, JPO, JP 10-305705 A, English Abstract.*

(Continued)

*Primary Examiner* — Paul N Dickson
*Assistant Examiner* — James English
(74) *Attorney, Agent, or Firm* — Hovey Williams LLP (57) ABSTRACT

A guiding wheel assembly, mainly for a hospital bed, including a wheel (1) with a horizontal rotation axis (6) installed on an arm (7) that is fixed to the frame (5) with the use of an axis (4) allowing swinging in the vertical plane. The wheel (1) is firmly fixed in the straight direction. The arm (7) is provided with a track (3), against which a pressing element (8) leans. The pressing element (8) is fixed with a pin (9) to the frame (5) in a swinging way.

7 Claims, 7 Drawing Sheets

U.S. PATENT DOCUMENTS

| | | | |
|---|---|---|---|
| 6,752,224 B2 * | 6/2004 | Hopper et al. | 180/22 |
| 6,772,850 B1 * | 8/2004 | Waters et al. | 180/65.51 |
| 6,792,630 B1 * | 9/2004 | Palmatier et al. | 5/86.1 |
| 6,846,042 B2 * | 1/2005 | Hanson et al. | 297/411.36 |
| 6,877,572 B2 * | 4/2005 | Vogel et al. | 180/15 |
| 6,902,019 B2 * | 6/2005 | Heimbrock et al. | 180/65.51 |
| 7,014,000 B2 * | 3/2006 | Kummer et al. | 180/19.3 |
| 7,200,894 B2 * | 4/2007 | Block et al. | 16/18 R |
| 7,419,019 B1 * | 9/2008 | White et al. | 180/19.3 |
| 7,480,948 B2 * | 1/2009 | Reinke et al. | 5/86.1 |
| 7,562,883 B2 * | 7/2009 | Livengood et al. | 280/87.01 |
| 7,698,760 B2 * | 4/2010 | Reckelhoff et al. | 5/600 |
| 7,810,822 B2 * | 10/2010 | Figel et al. | 280/47.38 |
| 7,828,092 B2 * | 11/2010 | Vogel et al. | 180/19.3 |
| 2006/0108158 A1 * | 5/2006 | Kummer et al. | 180/19.1 |
| 2006/0169501 A1 * | 8/2006 | Heimbrock et al. | 180/65.1 |
| 2009/0100598 A1 * | 4/2009 | Bly et al. | 5/510 |

FOREIGN PATENT DOCUMENTS

| | | | |
|---|---|---|---|
| JP | 2-57403 A | * | 2/1990 |
| JP | 10305705 | | 11/1998 |
| JP | 10305705 A | * | 11/1998 |
| JP | 2002177336 A | * | 6/2002 |
| JP | 2004284528 A | * | 10/2004 |

OTHER PUBLICATIONS

Toshiyasu Ishii, Transporting Carriage and Lift Caster, Nov. 17, 1998, JPO, JP 10-305705 A, Machine Translation of Description.*

Yuji Nakano, Wheelchair, Jun. 25, 2002, JPO, JP 2002-177336 A, English Abstract.*

Yuji Nakano, Wheelchair, Jun. 25, 2002, JPO, JP 2002-177336 A, Machine Translation of Description.*

* cited by examiner

GUIDING WHEEL ASSEMBLY, ESPECIALLY FOR A HOSPITAL BED

This is a national stage application under 35 U.S.C. §371 of International Application PCT/CZ2007/000089 filed 25 Sep. 2007 and published in English, claiming the benefit of Czech Republic application PUV2006-18253 filed 9 Nov. 2006, the entire disclosures of which are incorporated herein by reference.

TECHNICAL FIELD

The invention relates to a guiding wheel assembly, mainly for a hospital bed, comprising a wheel with a horizontal rotation axis installed on an arm that is fixed to the frame with the use of an axis allowing swinging in the vertical plane.

BACKGROUND ART

Some hospital beds are equipped with wheels to enable transport of patients between individual workplaces of the hospital. In the corners of the bottom frame of such a bed there are four travelling wheels that are freely turning around the vertical and horizontal axis. Such a design makes it possible to move the bed easily in all directions, but during the movements along hospital corridors it is difficult to keep the straight direction. This is why some beds are equipped with the fifth, so called guiding wheel that can be locked in the straight direction, so the bed keeps the straight direction.

The guiding wheel is usually positioned in the middle of the undercarriage, it is spring loaded and pressed to the floor with the force of approx. 200 to 500N. The control, i.e. locking of the guiding wheel in the straight direction may be either separate or derived from the control of the main wheels, or it may be self-locking.

A disadvantage of structures with separate control where the wheel is lowered onto the floor in such a way that the control force must overcome the force of the pressing spring is that the control force is relatively high while the accumulated energy of the compressed spring causes impacts during the control as well as noise when the wheel hits the floor.

In structures with a horizontal rotation axis combined with a vertical axis and locking control derived from the control of main wheels the locking in the straight direction is "preselected", but it is only activated when the bed starts moving after the part with the vertical axis turns to the straight direction due to the turning of the guiding wheel and the lock engages. An advantage is a low control force. A disadvantage in this case is delayed locking as the wheel is not locked in the straight direction until the corresponding parts of the locking mechanism are turned towards each other.

In structures with a horizontal rotation axis combined with a vertical axis and self-locking of the guiding wheel in the straight direction e.g. a spring-loaded ball is used against which a groove is created in the required place where the ball may fit into to prevent free turning of the guiding wheel around the vertical axis. An advantage is that you do not need any other control since the wheel is locked automatically in the straight direction as soon as the ball fits into the corresponding groove. A disadvantage is that if it is necessary to move the bed in another than straight direction, you must exert an increased pressure on the bed to make the spring-loaded ball get out of the groove to deactivate the locking of the guiding wheel while the straight direction is locked again when during the turning of the wheel around the vertical axis the ball gets to the groove again. This is also related to the risk of spontaneous unlocking of the guiding wheel when passing through a bed due to an excessive side force.

In cheaper version of beds the fifth guiding wheel is not installed at all and locking in the straight direction is achieved by locking of one of the four main travelling wheels. However, this solution requires higher skills of the personnel with regard to moving the bed and at the same time larger handling areas for turning (wider corridors) since the free end of the bed gets considerably out of direction.

Summary of the Invention

The above mentioned disadvantages are solved with a guiding wheel assembly, mainly for a hospital bed, comprising a wheel with a horizontal rotation axis installed on an arm that is fixed to the frame with the use of an axis allowing swinging in the vertical plane, characterized in that the wheel is firmly fixed in the straight direction and the arm is provided with a track, against which a pressing element leans, while the pressing element is fixed with a pin to the frame in a swinging way.

An advantage of this solution is that the guiding wheel is locked or unlocked immediately while the control forces are kept to the minimum. In addition, such a guiding wheel can be easily equipped with an electric drive as thanks to the design structure the power supply is simple.

To minimize the control forces it is advantageous if the track on the arm has the shape of a circle with its centre on the pin at least on a part of its surface.

In an advantageous embodiment behind the axis the arm continues as a lifting protrusion allowing lifting the guiding wheel over the floor.

In another advantageous version the pressing element comprises a spring.

For easy handling the pressing element may be equipped with a control pedal.

BRIEF DESCRIPTION OF DRAWINGS

The guiding wheel assembly according to the invention will be described in a more detailed way with the use of an example of a particular design shown in drawings where individual figures represent.

Description of the Preferred Embodiment

FIGS. 1 to 4 show a frame 5 of a hospital bed that has four traveling wheels in the corners that can freely turn around the vertical and horizontal axis. In the middle of the frame 5 there is the fifth, so called guiding wheel 1. The assembly of the guiding wheel 1 (see FIGS. 5 to 7) comprises side supporting metal sheets that are firmly fixed to the frame 5. The horizontal rotation axle 6 of the guiding wheel 1 is installed on an arm 7 that is fixed between the supporting side metal sheets of the frame 5 with the use of the axle 4. The arm can swing in the vertical plane about this axle 4, which is a first axle, with the axle 6 being a second axle about which the wheel rotates.

Figure 1:
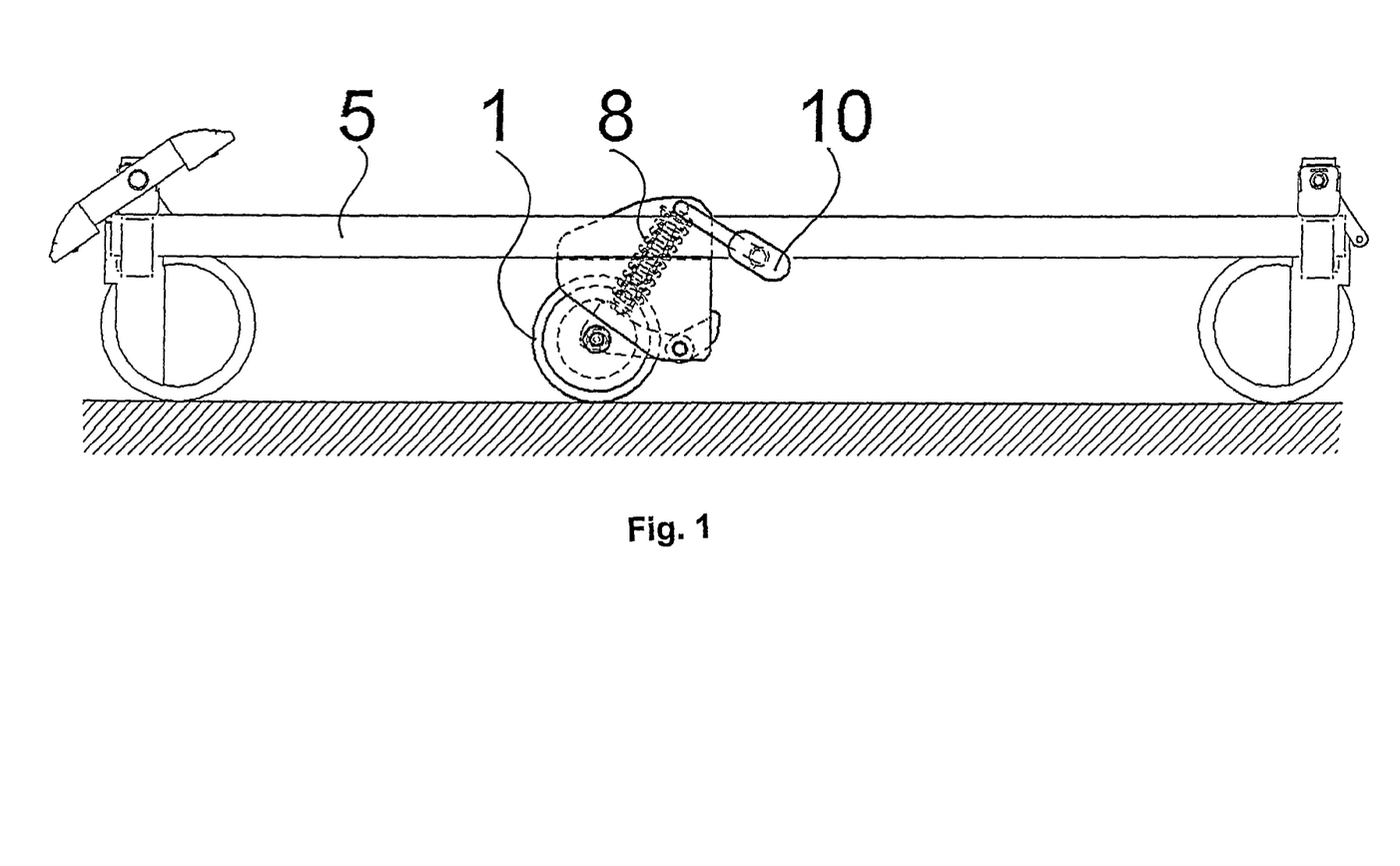
FIG. 1—side view of the guiding wheel assembly, installed on the hospital bed frame FIG. 2—top view of the assembly of FIG. 1
Figure 2:
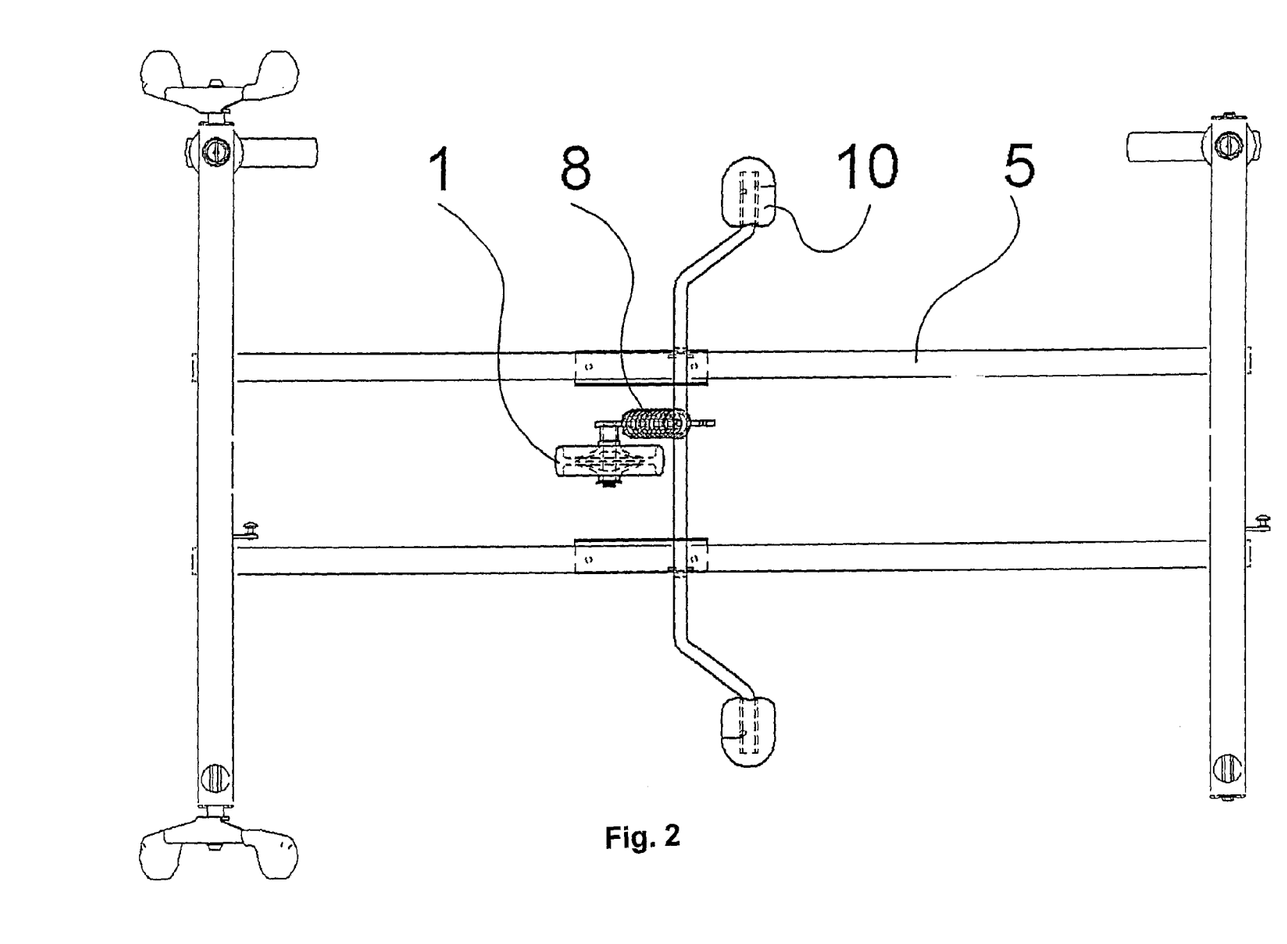
Figure 3:
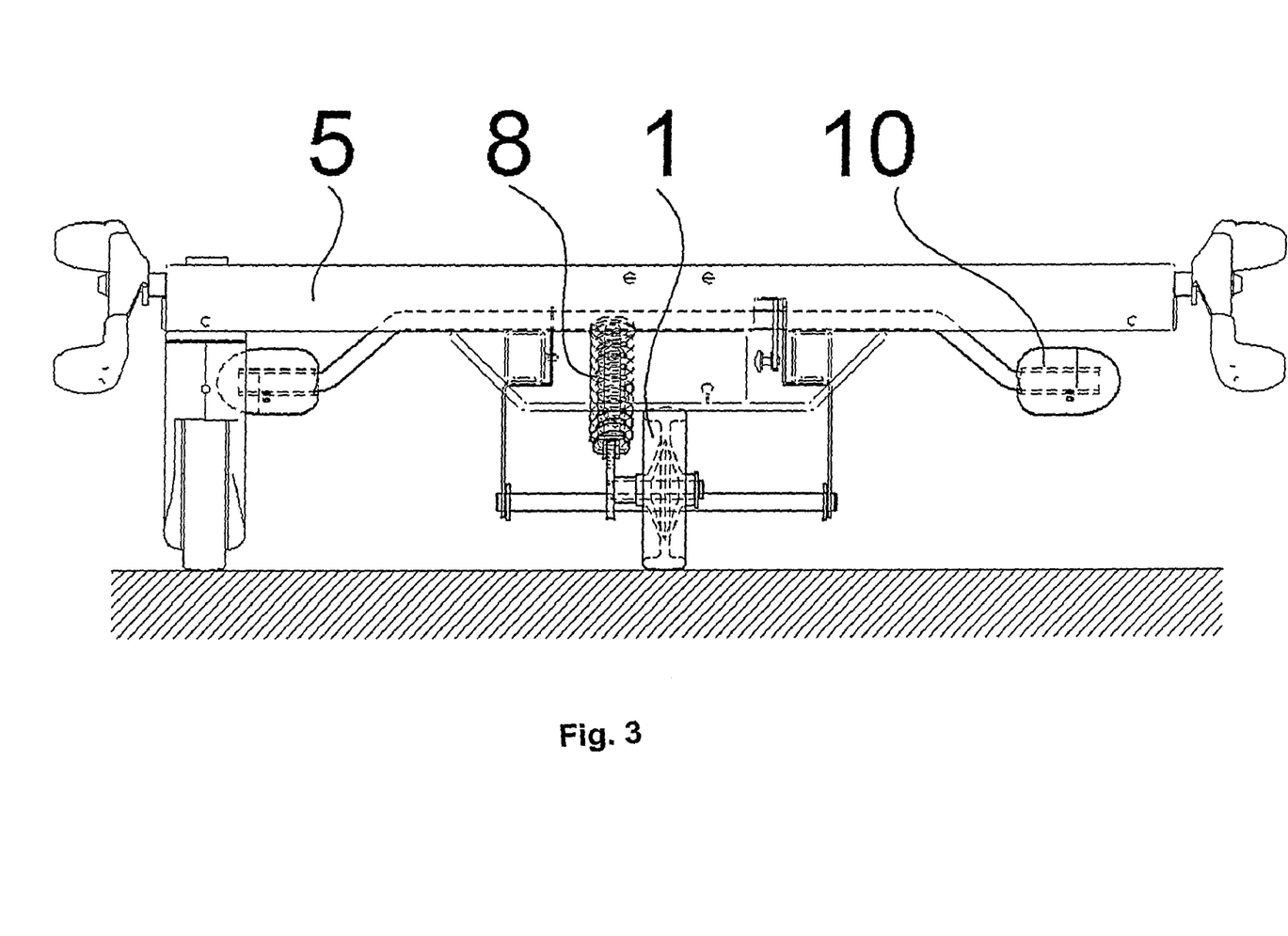
FIG. 3—front view of the assembly of FIG. 1
Figure 4:
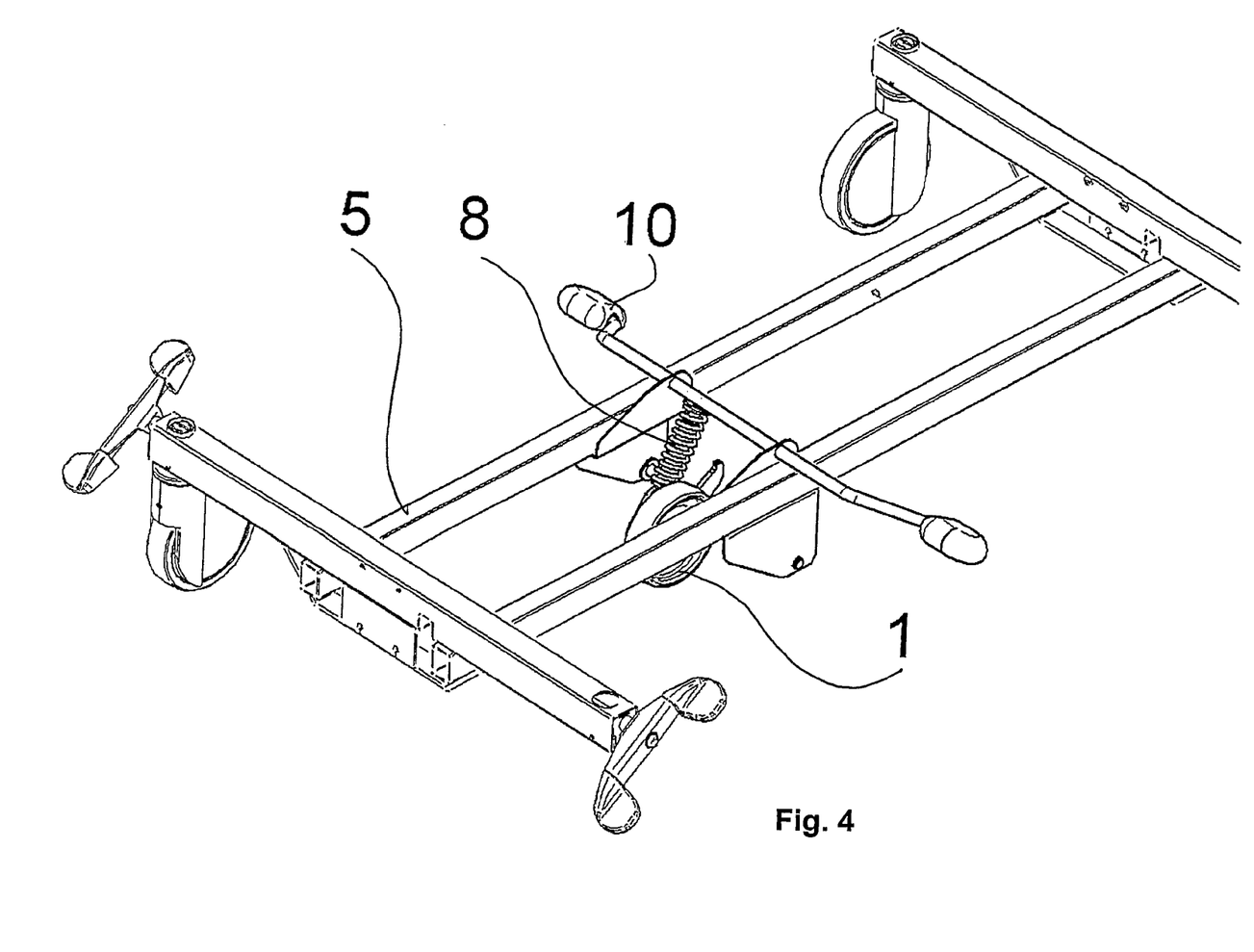
FIG. 4—perspective representation of the assembly of FIG. 1
Figure 5:
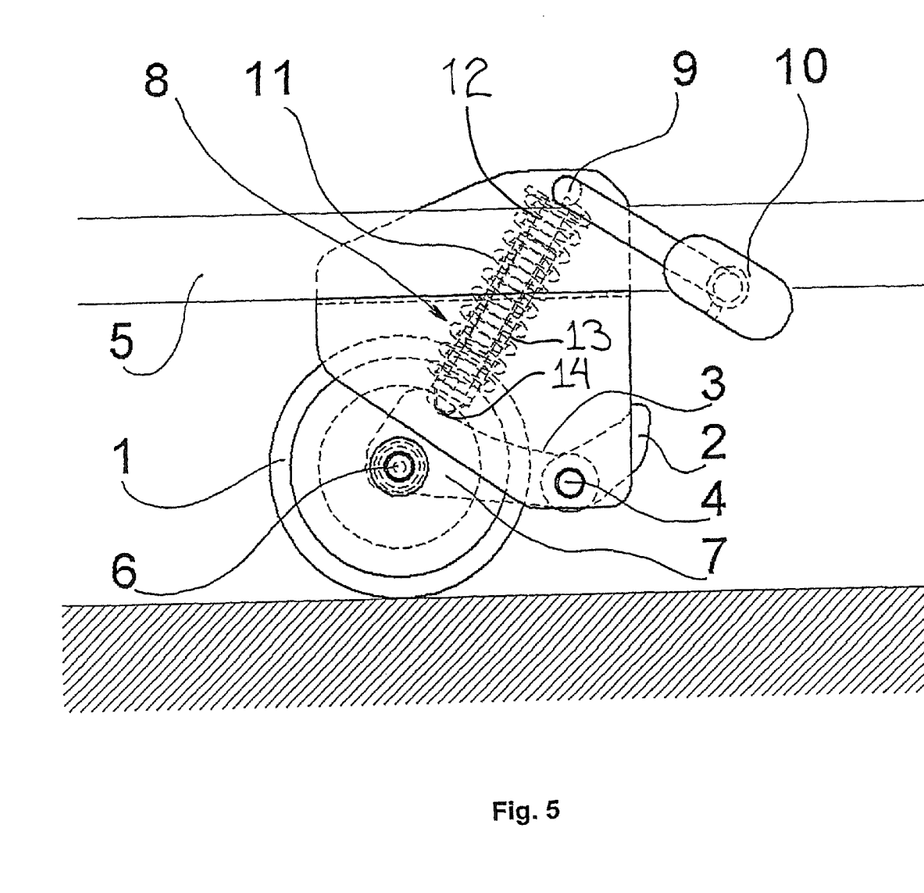
FIG. 5—detail of the assembly with the guiding wheel pressed to the floor with the maximum force FIG. 6—detail of the assembly with the guiding wheel relieved FIG. 7—detail of the assembly with the guiding wheel lifted off the floor
Figure 6:
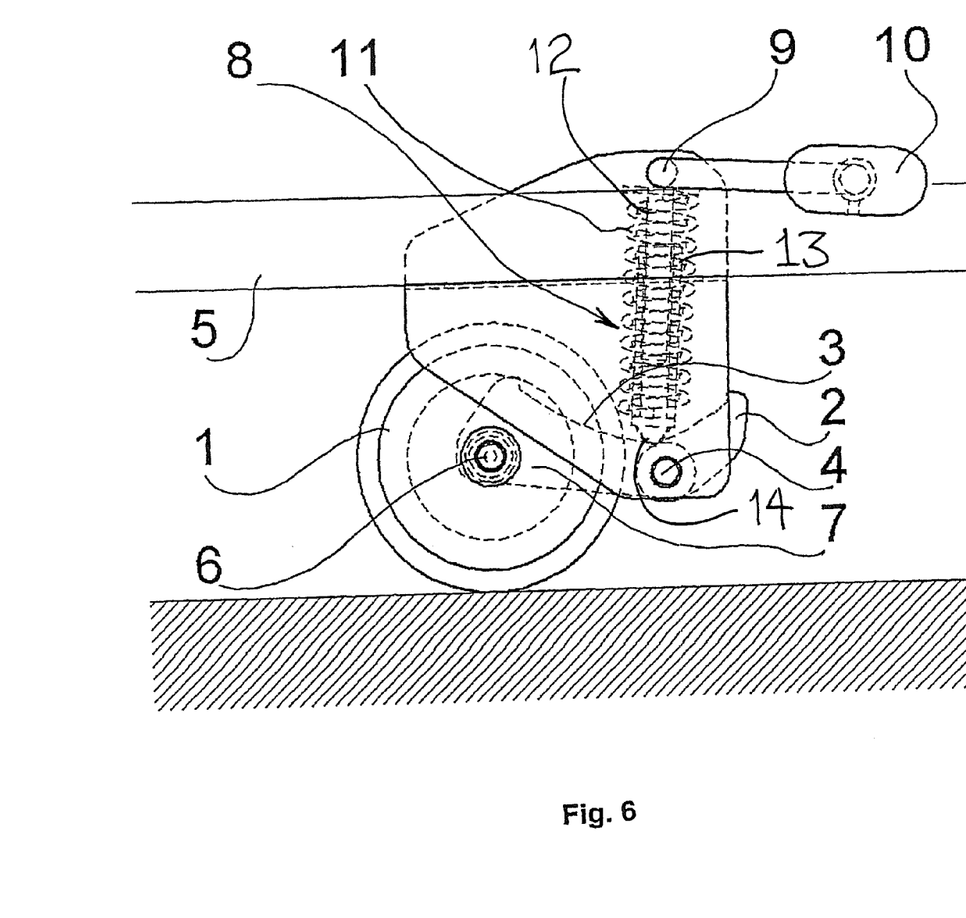
Figure 7:
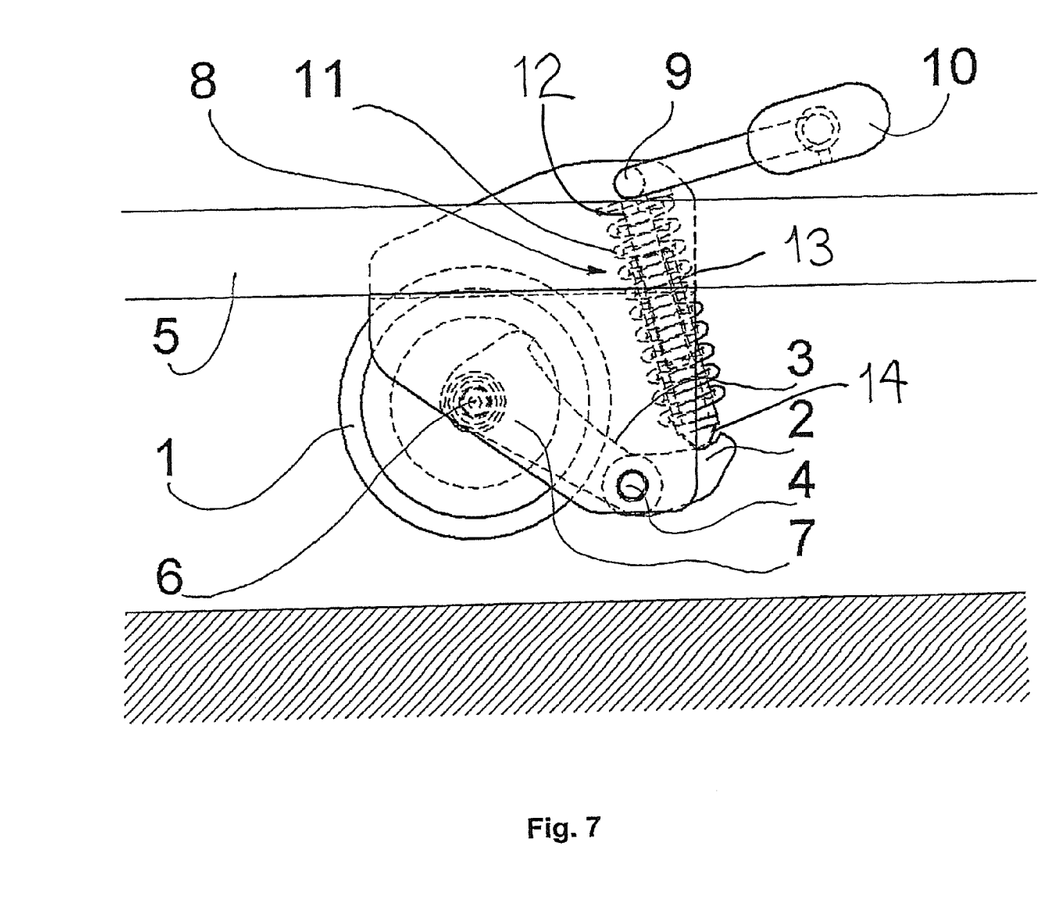

On the upper side of the arm 7 a track 3 is provided that the pressing element 8 presses on. As shown in FIGS. 5, 6 and 7, the pressing element 8 comprises a wound spring 11, and a pin 9 which may include a first inner part 12, and a second outer part 13 positioned around the first inner part 12 and which is shiftable relative to the first inner part 12, this being reflected by a comparison of the relative positions of the first inner part 12 and the second outer part 13 as shown in FIGS. 5, 6 and 7. A part of the pin 9 is swingably mounted to the frame 5 and thus with the use of the pin 9, the pressing element 8 is attached to the frame 5 in a swinging way. The second outer part 13 of the pressing element 8 may include an engagement portion 14 which is biased toward the track 3 by the spring 11. The spring 11 is concentrically positioned around the first inner part 12 and the second outer part 13 of the pressing element 8 as shown in the drawings. The track 3 on the on the upper side of the arm 7 has the shape of a circle with the center on the pin 9. After the axle 4 the arm 7 continues as a lifting protrusion 2 that is an integral part of the arm 7. The pressing element 8 is equipped with a control pedal for its turning between individual positions.

After pressing of the control pedal 10 (see FIG. 5) the engagement portion 14 of the pressing element 8 moves to the end of the arm 7 which is a first position on the track 3 proximate the second substantially horizontal axle 6 and the spring 11 presses the guiding wheel 1 with the maximum pressing force (approx. 300 to 400 N) to the floor. In this way the hospital bed keeps the straight direction (or the direction given by the operator) although the traveling wheels can freely turn about the vertical axis.

After moving the engagement portion 14 of the pressing element 8 to an intermediate or third position proximate to and above the first axle 4 of the arm 7 (see FIG. 6) in spite of the same pressure of the spring 11 exerted on the arm 7 (circular shape of the track 3) the resulting force on the guiding wheel is nearly zero and the guiding wheel 1 does not prevent the movement of the bed in any direction.

Through further lifting of the control pedal 10 the engagement portion 14 of the pressing element 8 moves to a second position on the portion of the track 3 on the lifting protrusion 2 (see FIG. 7) and lifts the arm 7 together with the wheel 1 above the floor. In this second position the lifted wheel 1 does not prevent the bed from crossing barriers.

The invention claimed is:

1. A guiding wheel assembly, adapted for mounting to a hospital bed, comprising:
   a frame;
   an arm having an elongated track;
   a first substantially horizontal axle pivotally mounting said arm to said frame for enabling swinging movement of said arm in a vertical plane;
   a wheel adapted for engaging a floor upon which the hospital bed is supported;
   a second substantially horizontal axle mounted to said arm and oriented substantially parallel to and spaced from said first axle and fixed against swinging movement about a vertical axis, said wheel being rotatably mounted to said second substantially horizontal axle;
   a pressing element extending between said frame and said track, said pressing element including an engagement portion and a spring for biasing said engagement portion into engagement with said track, said pressing element further including a pin swingably mounting said pressing element to said frame for enabling movement of said engagement portion of said pressing element along said track; and
   wherein said track includes an integral lifting protrusion positioned on an opposite side of the second substantially horizontal axle relative to the wheel, said engagement portion of said pressing element being movable along said track from a first position on said track proximate said second substantially horizontal axle for biasing said wheel against the floor, to a second position on said track on whereby said engagement portion is biased against said lifting protrusion for raising said wheel above the floor.

2. A guiding wheel assembly in accordance with claim 1, wherein said elongated track has a surface having an arcuate shape and wherein the engagement portion of the pressing element engages at least a part of the surface of the track.

3. A guiding wheel assembly in accordance with claim 1, wherein said pressing element includes a pedal operative for moving said engagement portion of the pressing element along said elongated track.

4. A guiding wheel assembly in accordance with claim 1, wherein said movement of the engagement portion of said pressing element along said track is in a path substantially parallel to said vertical plane.

5. A guiding wheel assembly in accordance with claim 1, wherein said engagement portion of said pressing element is movable along said track to a third position intermediate said first position and said second position and proximate said first substantially horizontal axle whereby said wheel exerts minimal force on the floor.

6. A guiding wheel assembly in accordance with claim 1, wherein said pressing element includes a first inner part extending from said pin and a second outer part positioned around said first part and shiftable relative to said first part, said second part including said engagement portion.

7. A guiding wheel assembly in accordance with claim 6, wherein said spring is concentrically positioned around said first part and said second part of said pressing element.

\* \* \* \* \*